United States Patent [19]

Yamashita et al.

[11] 4,001,019

[45] * Jan. 4, 1977

[54] REVERSIBLE LIGHT SENSITIVE GLASS

[75] Inventors: Toshiharu Yamashita, Hachioji; Tetsuro Izumitani, Hino, both of Japan

[73] Assignee: Hoya Glass Works, Ltd., Tokyo, Japan

[ * ] Notice: The portion of the term of this patent subsequent to Sept. 3, 1991, has been disclaimed.

[22] Filed: Apr. 2, 1974

[21] Appl. No.: 457,304

Related U.S. Application Data

[63] Continuation-in-part of Ser. No. 232,667, March 8, 1972, Pat. No. 3,833,511.

[30] Foreign Application Priority Data

Apr. 2, 1973 Japan .............................. 48-37708

[52] U.S. Cl. .............................. 106/54; 106/DIG. 6
[51] Int. Cl.$^2$ .......................................... C03C 3/08
[58] Field of Search ........................ 106/DIG. 6, 54

[56] References Cited

UNITED STATES PATENTS

| | | | |
|---|---|---|---|
| 3,208,860 | 9/1965 | Armistead et al. | 106/DIG. 6 |
| 3,306,833 | 2/1967 | O'Leary | 106/DIG. 6 |
| 3,419,370 | 12/1968 | Cramer et al. | 106/54 |
| 3,540,793 | 11/1970 | Araujo et al. | 106/DIG. 6 |
| 3,784,386 | 1/1974 | Araujo et al. | 106/DIG. 6 |
| 3,833,511 | 8/1975 | Yamashita et al. | 252/300 |

*Primary Examiner*—Winston A. Douglas
*Assistant Examiner*—William G. Wright
*Attorney, Agent, or Firm*—Sughrue, Rothwell, Mion, Zinn & Macpeak

[57] ABSTRACT

A reversible light sensitive glass comprising 100 parts of a base glass, 0.15 to 1.0 parts of Ag and an amount of halogen corresponding to or more than to the chemical equivalence of Ag, in which the base glass consists of, by weight %, $SiO_2$ 48 to 62, $Al_2O_3$ 7 to 15, $B_2O_3$ 17 to 26, $R_2O$ (where R represents Na, Li or K) 6 to 16, BaO 0.5 to 5, ($BaO/R_2O$ 0.05 to 0.40), $TiO_2$ 0 to 10, $ZrO_2$ 0 to 10, $Nb_2O_5$ 0 to 5, $TiO_2+ZrO_2+Nb_2O_5$ 0.5 to 15, $As_2O_3$ 0 to 2.0, and $Sb_2O_3$ 0 to 2.0 ($As_2O_3+Sb_2O_3<2.0$).

1 Claim, 1 Drawing Figure

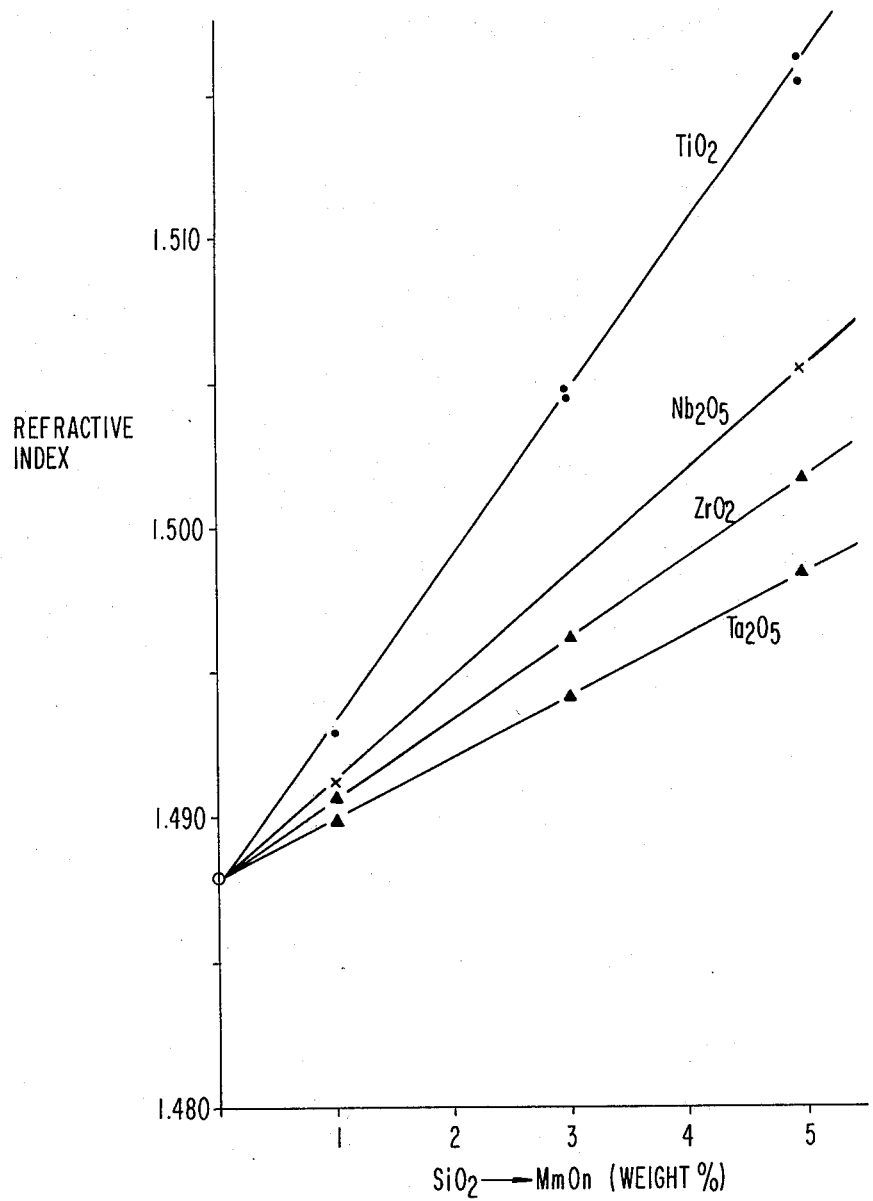

REVERSIBLE LIGHT SENSITIVE GLASS

This application is a continuation-in-part of application Ser. No. 232,667 filed Mar. 8, 1972 now U.S. Pat. No. 3,833,511.

BACKGROUND OF THE INVENTION

1. Field of the Invention

This invention relates to a reversible light sensitive glass which has a high refractive index ($n_d$ value higher than 1.50) and in which the present transmission is rapidly and reversibly changed depending on the radiation of ultraviolet rays and visible light of a short wave length.

2. Description of the Prior Art

Generally, a light shielding glass lens must be made from a reversible light sensitive glass having a property of rapidly responding to light. If the refractive index is increased, not only can the thickness of the glass lens be reduced but also the usual glass lens grinding dish can be employed with the glass lens.

The glass lens must have an $n_d$ of 1.523 for applying it to the usual glass lens grinding dish, but the modification of the $n_d$ value to such value is very difficult without reducing the ability of the glass to respond to light (hereinafter, light responding property) and the fading rate.

We, the inventors, have already proposed a reversible light sensitive glass having a high light responding property and the rapid fading rate, in U.S. Pat. application Ser. No. 232,667, filed on Mar. 8, 1972 which is based on the discovery that the coexistence of BaO and $R_2O$ increases the light responding property and the rapid fading rate of the glass. If the amount of BaO for obtaining the maximum light responding property and fading rate is restricted, the increase of the value of the refractive index to 1.50 or more is impossible.

On the other hand, the commercially available reversible light sensitive glass contains a large amount of BaO to increase the refractive index value at 1.523 and is used in combination with PbO for the same purpose inspite of the adverse effects of PbO on the light responding property and fading rate.

Accordingly, the resultant glass exhibits a poor light responding property and especially a low fading rate. For example, in the commercial glass the restoration of the up to 90% of the initial transmission requires about 60 min.

Besides, most reversible light sensitive glasses are not completely durable to weathering, although weather resistance is required especially for a glass which is always exposed to the atmosphere.

SUMMARY OF THE INVENTION

An object of this invention is to provide a reversible light sensitive glass having a relatively high refractive index without reducing the light responding property and fading rate.

Another object of this invention is to provide a reversible light sensitive glass having high weather resistance.

This invention has been accomplished on the discovery that $TiO_2$, $ZrO_2$, $Nb_2O_5$ and $Ta_2O_5$ in the glass increases the refractive index without reducing the fading rate, and also that the $ZrO_2$ remarkably improves the durability of the glass, especially the acid resistance.

BRIEF DESCRIPTION OF THE ACCOMPANYING DRAWING

The FIGURE shows the influence of $TiO_2$, $ZrO_2$, $Nb_2O_5$ and $Ta_2O_5$, each of which is substituted for a part of the $SiO_2$ in a glass composed by weight of $SiO_2$ 60.2%, $B_2O_3$ 18.6%, $Al_2O_3$ 8.3%, $K_2O$ 10.9%, $Li_2O$ 0.9%, BaO 1.2%, Ag 0.3%, Cl 1.1% and CuO 0.005%, on the increase of the refractive index of the glass.

DETAILED DESCRIPTION OF THE INVENTION

Referring now to the FIGURE, $TiO_2$ is most effective to increase the refractive index of the glass, when substituted for a part of the $SiO_2$. Although $TiO_2$ is effective to increase the refractive index of the glass, the use of $TiO_2$ has been avoided conventionally for the following reasons.

$TiO_2$ colors greatly such a type of glass, and the colored glass becomes useless as a glass lens. The Ti ion derived from the $TiO_2$ absorbs ultraviolet rays thereby decreasing the light sensitivity.

Accordingly, one feature of this invention is to introduce $As_2O_3$ and $Sb_2O_3$ into the $TiO_2$ containing glass thereby to eliminate the defects of the glass caused by the addition of $TiO_2$.

It was found that the remarkable coloring of the glass due to the $TiO_2$ addition was unexpectedly extinguished by introducing a small amount of $As_2O_3$ to the glass. A glass which was a strong red-brown color by the addition of only 3 weight % of $TiO_2$ was restored in its transparency to the equivalent of that without $TiO_2$ by introducing only 0.02% of $As_2O_3$ and/or $Sb_2O_3$.

Another feature of this invention is to substitute a part of the Cl with Br and I. It was discovered that the reduction in the light sensitivity of the glass due to the absorption of ultraviolet rays by the Ti ion could be prevented by substituting a part of the Cl with Br and I which shifted the light sensitive wave length range of the glass towards the long wave length side.

As described above, this invention makes the use of $TiO_2$, which is very effective to increase the refractive index of the glass, possible without reducing the light sensitivity and the fading rate.

The reversible light sensitive glasses according to this invention are;

1. A reversible light sensitive glass comprising 100 weight parts of a base glass, 0.15 to 1.0 weight parts of Ag and a small amount of a halogen corresponding to the chemical equivalence of Ag, in which the base glass is composed of, by weight % $SiO_2$ 48 to 62, $Al_2O_3$ 7 to 15, $B_2O_3$ 17 to 26, $R_2O$ (where R represents Na, Li or K) 6 to 16, BaO 0.5 to 5, (BaO/$R_2O$ 0.05 to 0.40), $TiO_2$ 0 to 10, $ZrO_2$ 0 to 10, $Nb_2O_5$ 0 to 5, $TiO_2+ZrO_2+Nb_2O_5$ 0.5 to 15, $As_2O_3$ 0 to 2.0 and $Sb_2O_3$ 0 to 2.0 ($As_2O_3+Sb_2O_3$ <2.0).

2. A reversible light sensitive glass as above described in item (1), wherein the amount of $As_2O_3+Sb_2O_3$ is 0.02 to 2.0% when the $TiO_2$ amount exceeds 1%, and a part of Cl is substituted with more than 0.1 parts of Br+I.

The slightest amount of BaO remarkably increases the color concentration of the glass, and a coexistence of BaO and $R_2O$, especially $K_2O$, increases the fading rate. In order to obtain a sufficiently high color concentration and fading rate, the addition of more than 0.5% of BaO is required to keep the ratio of BaO/$R_2O$ at a value higher than 0.05.

On the other hand, more than 5.0% of BaO in the glass and a BaO/R₂O ratio of more than 0.40 cause rather a reduction in the color concentration and a low fading rate.

Accordingly, the BaO amount and the BaO/R₂O ratio advantageously are 0.5 to 5.0% and 0.05 to 0.40, respectively.

Less than 6% of $R_2O$ is not sufficient to exhibit the cooperation of BaO and $R_2O$, whereas more than 16% $R_2O$ decreases the durability of the glass. Accordingly, the advantageous amount of $R_2O$ is 6 to 16%. Less than 7% of $Al_2O_3$ and less than 17% of $B_2O_3$ does not provide a sufficient amount of $Al_2O_3$ and $B_2O_3$ to exhibit their action together with BaO and $R_2O$. Use of more than 15% of $Al_2O_3$ does not provide more effective results and decreases the fusability of the glass. More than 26% of $B_2O_3$ makes the glass unstable and decreases the transparency of the glass due to phase separation during heat treatment.

Accordingly, the advantageous amount of $Al_2O_3$ and $B_2O_3$ are 7 to 15 and 17 to 26%, respectively.

A glass having a high color concentration and a rapid fading rate cannot be formed with more than 62% of $SiO_2$, and the fusing of the glass is difficult with an $SiO_2$ level of above 62%. On the other hand, the addition of less than 48% of $SiO_2$ decreases the chemical durability of the glass and increases phase separation during the heat treatment. Accordingly, the advantageous $SiO_2$ amount is 48 to 60%.

More than 10% of $TiO_2$ and $ZrO_2$ makes the glass unstable and reduces the fading rate.

Since $Nb_2O_5$ is very expensive the addition of more than 5% of $Nb_2O_5$ is not suitable as raw material of the glass lens.

$Ta_2O_5$ is effective to improve the light responding properties of the glass but is also very expensive. If the sum of $TiO_2$, $ZrO_2$ and $Nb_2O_5$ is decreased below 0.5%, a glass having a refractive index greater than 1.5 can not be produced. On the other hand, more than 15% of $TiO_2+ZrO_2+Nb_2O_5$ causes the glass to be unstable and decreases the fading rate. More than 2% of $As_2O_3$ and/or $Sb_2O_3$ makes the precipitation of crystal grains of Ag halide in the glass difficult, thus greatly decreasing the light sensitivity.

Especially, more than 0.02% of $As_2O_3+Sb_2O_3$ remarkably prevents the coloring of the glass due to the $TiO_2$ present therein at a content of more than 1%.

The light sensitive components added to 100 parts of such a base glass composition are Ag 0.15 to 1.0 parts and halogen in an amount corresponding to or more than the chemical equivalence of Ag.

An addition of less than 0.15 parts of Ag is not sufficient to form the full amount of Ag halide in the glass and to obtain the full color concentration. On the other hand, more than 1.0 parts of Ag causes the glass to be a light milky opaque, and the resultant glass is not useful for a glass lens.

Sufficient color concentration can not be obtained with a halogen amount below the chemical equivalence of Ag.

When more than 1% of $TiO_2$ exists in the glass, more than 0.1 parts of Br+I shifts the light sensitive wave length range towards the long wave length side preventing a reduction in the light sensitivity.

A very small amount of CuO increases the color concentration, but more than 0.015% of CuO is rather ineffective.

Some Examples of this invention are shown by reference to the following Table.

| | 1 | 2 | 3 | 4 | 5 | 6 | 7 | 8 | 9 |
|---|---|---|---|---|---|---|---|---|---|
| SiO₂ | 55.2 | 52.2 | 59.2 | 50.0 | 53.9 | 54.2 | 51.2 | 50.6 | 50.6 |
| B₂O₃ | 18.6 | 21.6 | 13.6 | 16.6 | 18.6 | 18.9 | 18.6 | 18.6 | 17.6 |
| Al₂O₃ | 8.3 | 8.3 | 8.3 | 14.0 | 8.3 | 8.5 | 11.5 | 5.3 | 5.3 |
| K₂O | 10.9 | 10.9 | 10.9 | 9.9 | 10.9 | 8.2 | 8.2 | 10.9 | 8.9 |
| Na₂O | & — | & — | & — | & — | & — | & — | 0.7 | 2.0 | 0.6 |
| Li₂O | & 0.9 | & 0.9 | & 0.9 | & 0.9 | & 0.9 | & 1.8 | 1.8 | 0.9 | 0.9 |
| BaO | 1.2 | 1.2 | 1.2 | 1.2 | 1.0 | 1.0 | 1.0 | 1.2 | 1.2 |
| TiO₂ | & — | & — | 5.0 | 2.5 | 6.3 | 5.3 | 4.9 | 3.0 | 6.0 |
| ZrO₂ | & 5.0 | — | & — | 4.0 | & — | 1.9 | 1.9 | 6.0 | 6.0 |
| Nb₂O₅ | & — | & 5.0 | — | & — | — | & — | & — | 1.6 | 3.0 |
| As₂O₃ | — | & — | & 0.5 | & 0.9 | & 0.2 | & 0.1 | — | 0.03 | & — |
| Sb₂O₃ | — | — | 0.4 | & — | & — | 0.1 | & 0.2 | & — | & 0.05 |
| Ag | & 0.3 | & 0.3 | 0.3 | & 0.3 | & 0.3 | 0.6 | 0.6 | & 0.3 | 0.6 |
| Cl | 1.1 | 1.1 | 1.1 | 1.1 | 1.1 | 0.6 | 0.6 | 0.3 | 0.6 |
| Br | & — | & — | & — | & — | & — | 0.5 | & — | 0.8 | 0.6 |
| I | — | — | — | — | — | & — | & 0.5 | & — | & — |
| CuO | & 0.005 | & 0.005 | & 0.005 | & 0.005 | & 0.005 | & 0.005 | 0.08 | & 0.005 | & 0.007 |
| $n_d$ | 1.502 | 1.506 | 1.516 | 1.513 | 1.523 | 1.525 | 1.524 | 1.523 | 1.531 |
| *A.R(%) | 0.12 | 0.17 | 0.23 | 0.20 | 0.18 | 0.19 | 0.17 | 0.25 | 0.25 |
| **T₉₀ (min) | 10 | 5 | 15 | 15 | 16 | 15 | 15 | 20 | 20 |

*A.R (%)- Acid resistance as shown by weight loss (%)
**T₉₀(min)- Time required for restoring 90% of the initial transmission The fading velocity of the glass of this invention is indicated by time period ($T_{90}$) for restoring 90% of the initial transmission of the glass after the light irradiation was ceased. The coloring of the glass was carried out by irradiation with light from a 500W Xenon lamp on a glass plate of a thickness of 3 mm at a distance of 10 cm from the light source and the fading was done in the absence of irradiation. The percent transmission of the glass at each time was measured using a spectrophotometer at a wavelength 550 m$\mu$.

The glass of this invention can be produced by melting a mixture of each of the components in a platinum or ceramic crucible at 1400° to 1500° C, (stirring) the melt and pouring the melt into a mold, and pressing therein. The glass obtained is heat treated at a temperature ranging between the transformation temperature and the softening temperature for several minutes to several hours whereby a reversible light sensitive glass having a rapid coloring rate and fading rate is obtained.

As shown in the Examples, the glasses of this invention exhibit an $n_d$ value of more than 1.50 in spite of their high coloring and fading rates. A commercially available reversible light sensitive glass required about 60 minutes for a restoration of 90% of its transmission, whereas the glass of this invention required only 5 to 20 minutes for this purpose.

Since the $n_d$ value of the glass of this invention can be easily adjusted to 1.523, a specially shaped grinding tray is not required. According to this invention, glasses having a higher $n_d$ value can be produced, and thinner glass lens can be produced.

While this invention has been described in detail and with reference to particular embodiments thereof, it will be understood that numerous modifications may be made therein by those skilled in the art without departing from the scope of this invention.

Therefore, the appended claims are intended to cover all such equivalent variation as coming within the true spirit and scope of this invention.

What is claimed is:

1. A reversible light sensitive glass comprising 100 weight parts of a base glass, 0.15 to 1.0 weight parts of Ag and an amount of halogen corresponding to or more than the chemical equivalence of the Ag, in which the base glass consists, in weight %, of $SiO_2$ 48 to 62, $Al_2O_3$ 7 to 15, $B_2O_3$ 17 to 26, $R_2O$, where R represents Na, Li or K, 6 to 16, BaO 0.5 to 5, $BaO/R_2O$ 0.05 to 0.40, $TiO_2$ 0 to 10, $ZrO_2$ 0 to 10, $Nb_2O_5$ 0 to 5, $TiO_2+ZrO_2+Nb_2O_5$ 0.5 to 15, $As_2O_3$ 0 to 2.0, $Sb_2O_3$ 0 to 2.0 and $As_2O_3+Sb_2O_3$ <2.0.

* * * * *